US012778103B2

(12) United States Patent
Fabi Moreira et al.

(10) Patent No.: US 12,778,103 B2
(45) Date of Patent: Nov. 3, 2026

(54) METHOD FOR DETECTION AND CLASSIFICATION OF INSECTS AND ANIMALS

(71) Applicants: RADAZ INDUSTRIA E COMÉRCIO DE PRODUTOS ELETRONICOS LTDA, São José dos Campos (BR); ANÁHATA SOLUÇÕES INOVADORAS EM AGRONOMIA LTDA, Piracicaba (BR)

(72) Inventors: Laila Fabi Moreira, São José dos Campos (BR); Regina Bernardina Johanna Hakvoort, Sorocaba (BR)

(73) Assignees: RADAZ INDUSTRIA E COMÉRCIO DE PRODUTOS ELETRONICOS LTDA, São José dos Campos (BR); ANÁHATA SOLUÇÕES INOVADORAS EM AGRONOMIA LTDA, Piracicaba (BR)

( * ) Notice: Subject to any disclaimer, the term of this patent is extended or adjusted under 35 U.S.C. 154(b) by 80 days.

(21) Appl. No.: 19/119,515

(22) PCT Filed: Sep. 21, 2023

(86) PCT No.: PCT/BR2023/050315
§ 371 (c)(1),
(2) Date: Apr. 9, 2025

(87) PCT Pub. No.: WO2024/050617
PCT Pub. Date: Mar. 14, 2024

(65) Prior Publication Data

US 2026/0157360 A1 Jun. 11, 2026

(51) Int. Cl.
*A01M 1/02* (2006.01)
*A01M 31/00* (2006.01)
*G01S 13/04* (2006.01)

(52) U.S. Cl.
CPC .......... *A01M 1/026* (2013.01); *A01M 31/002* (2013.01); *G01S 13/04* (2013.01)

(58) Field of Classification Search
CPC ............................ A01M 1/026; A01M 31/002
See application file for complete search history.

(56) References Cited

U.S. PATENT DOCUMENTS

| | | | | |
|---|---|---|---|---|
| 6,466,688 | B1 * | 10/2002 | Ramstack | G06F 18/20 250/326 |
| 10,577,103 | B2 | 3/2020 | Cantrell et al. | |

(Continued)

FOREIGN PATENT DOCUMENTS

| | | | | |
|---|---|---|---|---|
| EP | 4609712 A1 * | 9/2025 | | G06V 10/764 |
| GB | 2499502 A * | 8/2013 | | G01V 3/38 |

(Continued)

OTHER PUBLICATIONS

International Search Report issued on Dec. 26, 2023, in corresponding International Application No. PCT/BR2023/050315; 4 pages.

*Primary Examiner* — Christopher P Ellis
(74) *Attorney, Agent, or Firm* — Maier & Maier, PLLC

(57) ABSTRACT

A method for detection and classification of insects and animals, aiming at pest control affecting crops and the detection of insects and animals through radar. The method includes a comparison between a set of patterns derived from the echo of a centimeter-wave radar signal captured in the field by an operational radar and a characteristic signature of each animal species determined through data processing carried out in a laboratory. This processing involves the generation of a spectrogram from the Doppler signal produced by the movement of the animal species'appendages, which, in the case of insects, consists of wing flapping. For each species, a signature is generated from the spectrogram and the relevant patterns selected (Continued)

among the group consisting of standard deviation, kurtosis, skewness, entropy, and energy of the radar signal echo.

15 Claims, 5 Drawing Sheets

(56) References Cited

U.S. PATENT DOCUMENTS

| | | | | |
|---|---|---|---|---|
| 11,102,969 | B2 | 8/2021 | Peters et al. | |
| 2025/0280819 | A1* | 9/2025 | Ward | G06F 16/45 |
| 2026/0123620 | A1* | 5/2026 | Reyntjens | A01M 3/007 |

FOREIGN PATENT DOCUMENTS

| | | | | |
|---|---|---|---|---|
| WO | WO-2020058175 | A1 * | 3/2020 | A01M 1/026 |
| WO | WO-2026033091 | A1 * | 2/2026 | G01S 13/522 |

* cited by examiner

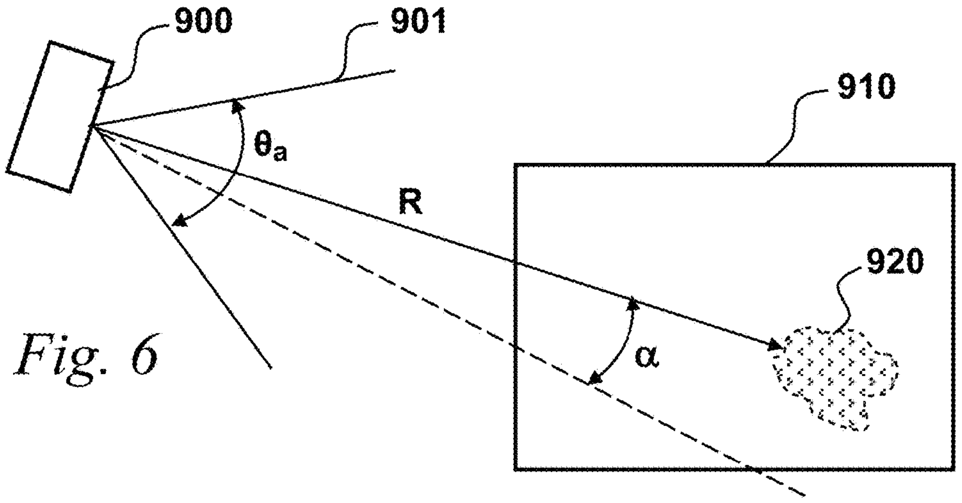
Fig. 6
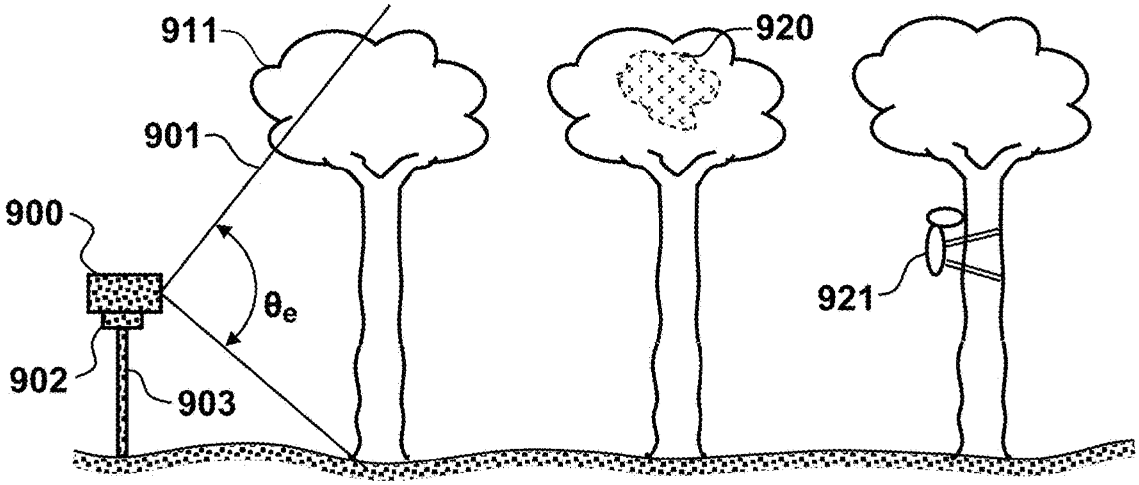
Fig. 7-a
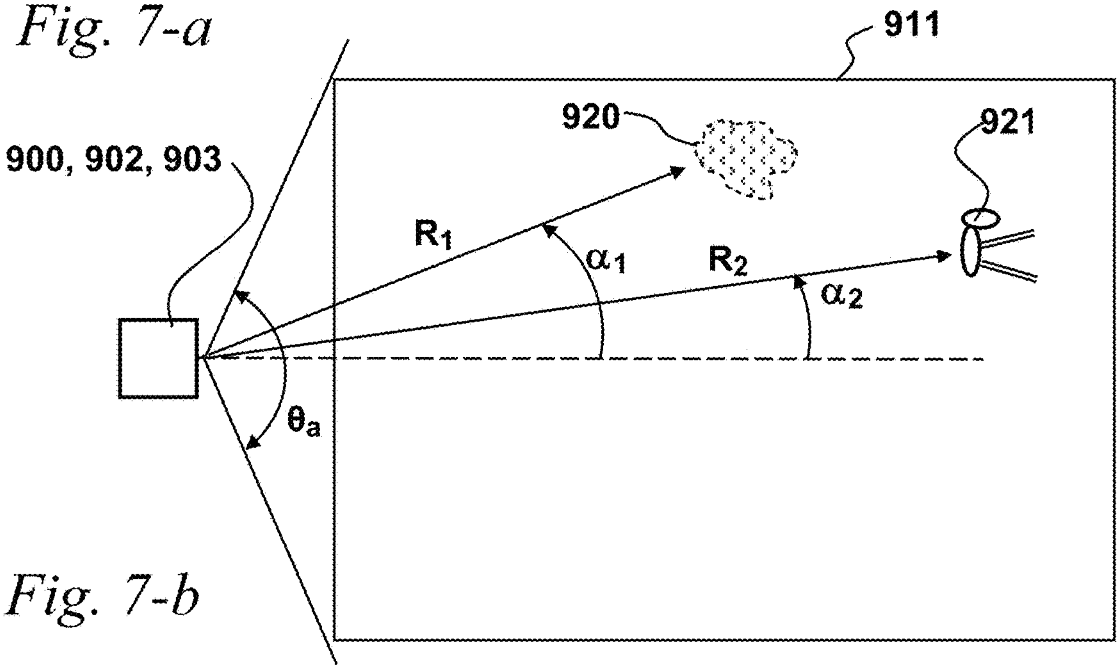
Fig. 7-b

METHOD FOR DETECTION AND CLASSIFICATION OF INSECTS AND ANIMALS

FIELD

The present invention relates to the control of pests that affect crops and, more specifically, to the detection of insects and animals by radar.

BACKGROUND

Insects make up the most diverse and numerous class of arthropods, with approximately one million species described to date. They are the only invertebrates equipped with wings capable of autonomous flight, which they use to carry out essential activities such as seeking shelter and food, locating host plants, avoiding predators, finding mates, searching for oviposition sites, and long-distance migration. Many billions of insects migrate annually, with considerable economic consequences such as crop damage and the spread of diseases in plants, as well as in humans and livestock.

Since most migratory insect species are nocturnal, fly hundreds of meters above the ground, and are too small to be observed or tracked individually, knowledge about insect migration is still limited—especially when compared to that of birds, bats, and terrestrial or marine mammals.

Traditionally, insect monitoring is carried out through fieldwork, where one or more individuals walk through the crop fields and observe the presence of insects. This work is performed by sampling, meaning only a portion of the field is inspected. Furthermore, this monitoring is predominantly conducted during the day and on a discontinuous basis, that is, with weekly intervals.

To assist this work, tools such as sexual or food pheromones are periodically placed in traps to attract specific insect species, helping to identify the presence of certain pests in a region. Other insects may be identified using adhesive traps with attractive colors.

However, these tools require substantial labor for their distribution, replacement, and collection if one intends to cover the entire planted area.

Because these methods do not allow for the precise identification of the initial outbreak or areas with the highest pest concentration, it becomes necessary to apply pesticides across the entire area, using large quantities of insecticides and requiring intensive spraying, whether by land or air. This also stems from the fact that current monitoring methods do not detect the onset of the infestation—pests are usually noticed only when the area is already heavily infested, often with several generations of insects already developed.

Pest insects, which cause direct or indirect damage to crops, tend to reproduce exponentially, reaching large population levels in a short period of time. This requires frequent pesticide applications and can still result in irreversible damage. For example: coleopterans (such as the cotton boll weevil and the coffee borer) and lepidopterans (polyphagous or non-polyphagous moths which, depending on the species, may lay up to 1,300 eggs per night, generating large numbers of caterpillars that attack crops such as corn, soybean, cotton, tomato, and beans, among others).

Severe damage is also caused by vector insects, generally sap-sucking species that, while feeding on the plant, transmit viruses or bacteria, resulting in irreversible damage and productivity loss—sometimes requiring complete crop eradication. Examples include: whiteflies in beans or papaya, thrips in tomatoes, leafhoppers in corn, grapes, and pastures, and citrus psyllids in citrus crops.

Human history contains several reports of entire crops being decimated in some regions due to pest attacks. For example, the cotton boll weevil decimated the crop in northeastern and southeastern Brazil, rendering cotton cultivation unviable due to direct damage losses exceeding 70% in the late 1980s. The citrus psyllid vector reduced orange productivity in Florida (USA) to just one-quarter of its original level. There are regions in Brazil's citrus belt where contamination rates of 60% of plants with greening are already being reached—a disease caused by a bacterium spread by the psyllid—which makes orchards unviable.

The current methods for identifying pests in crops occur in three ways, varying according to the pest insect species.

Traps using species-specific sexual or food pheromones. These attract insects, which become trapped and can therefore be quantified. The number of insects collected is an indicator of presence or absence—or even of infestation severity when the numbers are very high. Still, it is only an indication, as it does not precisely reveal whether the entire area is infested or if the pest is more localized. Furthermore, due to the specificity of the pheromones, this technology is available for only a few species.

Adhesive traps, usually colored, where insects are captured and later visually identified by a trained technician.

Visual monitoring, which consists of monitors walking randomly through the fields, observing the plants and quantifying the pests found. The intervals for rechecking the areas are weekly. In recent years, the innovation in this sector has been the digitalization of the field notebook (the data recorded is now entered by the monitor using a tablet or data collector), but it remains essentially a sampling process and does not provide information about what is actually happening in the entire area, nor in real time, but rather according to the monitoring schedule.

There are innovations using imagery of productive areas, whose heat maps identify nutrient deficiencies, weeds, and diseases already established to the point where the plant shows symptoms. Few pests can be identified through this method, such as leaves eaten or deformed by caterpillars, or yellowing orange trees due to greening. In these latter two cases, radar will provide the information well before the damage occurs, as the pest will be identified as soon as it enters the area. By making a control decision and taking action based on predictive information, the appearance of symptoms and damage can be greatly reduced.

The first two methods provide an indication of the presence or absence of pests in the crop, serving more as a signal than a precise measurement; furthermore, they are limited to just a few insect species. The most commonly used method for making decisions about pesticide application is pest monitoring carried out by technicians trained in insect identification. However, it presents several issues, such as the very high turnover of personnel for this type of work, requiring new training each year, and relying on inexperienced workers to correctly recognize pests. Imaging will only quantify the damage already caused, as it will not identify most pest species—only their damage.

The evaluation of insects and their quantity becomes dependent on the quality of the labor; there is a tendency for the person to walk through the area in a similar pattern, not necessarily where a pest outbreak is located. On the other hand, the intervals for returning to the areas for new monitoring are often too long, and the number of monitors hired is generally less than ideal.

Moreover, in all three methodologies described, professionals need to travel to the affected areas, either to monitor the number of insects or to replace the pheromone, making the monitoring process costly and time-consuming.

An important function of monitoring is to assist in the decision-making process regarding whether to apply pesticides or release insects. However, current methods do not allow for an assessment of the quality of control achieved by a pesticide application, for example. Thus, if there is an error in the application quality, it often goes unnoticed.

In addition to insects, economically important crops have been affected by larger predatory animals, such as wild boars. This exotic species reproduces at a geometric rate. Nocturnal in habit, it moves in groups, causing major damage to crops, especially corn. Males of this species can travel up to 12 km in a single night. The wild boar (Sus scrofa) is a species native to Europe, introduced to Brazil many years ago, and has since become feral and uncontrollable. Due to the impact it already causes, hunting with bladed or firearm weapons is authorized and permitted by public agencies, in accordance with IBAMA Normative Instruction No. 03/2013. With its location identified by radar, hunters can be more effective in culling this animal.

Another example of a harmful animal is the capuchin monkey, which has been causing damage in forested areas, more specifically in pine production.

SUMMARY

In view of the foregoing, the objective of the present invention is to provide a method and a system aimed at improving pest monitoring to support decision-making, making control more effective and applied at the appropriate time, optimizing the use of insecticides and acaricides, and reducing their impact on the ecosystem.

Another objective is to enable real-time monitoring of the evolution of pest populations in response to pesticide application or the release of microphagous insects.

Another objective is to provide real-time monitoring of the precise geographic coordinates of areas infested by insects or predatory animals in crop and/or forest regions.

The above objectives, as well as others, are achieved by the invention through the provision of a system comprising a small-sized centimeter-wave radar, either fixed or transportable by aircraft, with low power consumption and reduced cost, capable of reaching distances ranging from tens of meters to kilometers.

According to another feature of the invention, a method is provided in which the insect or vertebrate animal is detected by the radar echo and identified through the analysis of the spectrogram of the Doppler signal generated by its movement and wing flapping (in the case of insects) or by its body movement (in the case of vertebrates).

According to another characteristic, the invention comprises a method for determining the signature of each animal species, said signature comprising information related to the spectrogram of the radar signal echo and associated data.

According to another characteristic of the invention, said signature is composed of the spectrogram of the Doppler signal produced by the radar signal echo and respective associated information related to one or more of the following patterns: histogram, standard deviation, kurtosis, skewness, entropy, and energy of both the spectrogram itself and the corresponding radar signal echo.

According to another characteristic of the invention, the acquisition of the radar signal echo comprises illuminating an insect with a radiation beam from a centimeter-wave radar, capturing the reflected signal, and processing it to obtain the corresponding spectrogram.

According to another characteristic of the invention, said illumination and capture of the reflected signal are carried out inside an anechoic chamber.

According to another characteristic of the invention, the insect is held in a container with walls that are transparent to radar waves.

According to yet another characteristic of the invention, at least one signature associated with the insect of interest is used to train a neural network.

According to another characteristic of the invention, the trained neural network is loaded into the radar in the form of software, and the radar then becomes capable of detecting, classifying, and estimating the quantity of the previously trained insects and animals, and reporting their respective positions in real time.

According to another characteristic of the invention, the system comprises a neural network that is trained using a set of signatures, each corresponding to a specific species of insect or animal.

The use of a large set of signatures for each species of insect and animal ensures the robustness of the neural network in the detection and classification process. The trained neural network is loaded into the radar in the form of software, and the radar becomes capable of detecting, classifying, and estimating the quantity of the previously trained insects and animals, and reporting their respective positions in real time.

BRIEF DESCRIPTION OF FIGURES

The other features and advantages of the invention may be better understood through the description of an exemplary and non-limiting embodiment and the figures related to it, in which:

FIG. 6 is a top view of a typical radar installation for insect detection in a crop field.

FIG. 7-*a* is a side view and FIG. 7-*b* is a top view of a field arrangement for detecting insects and vertebrate animals in an industrial forest.

DETAILED DESCRIPTION OF THE EMBODIMENTS

Figure 1:
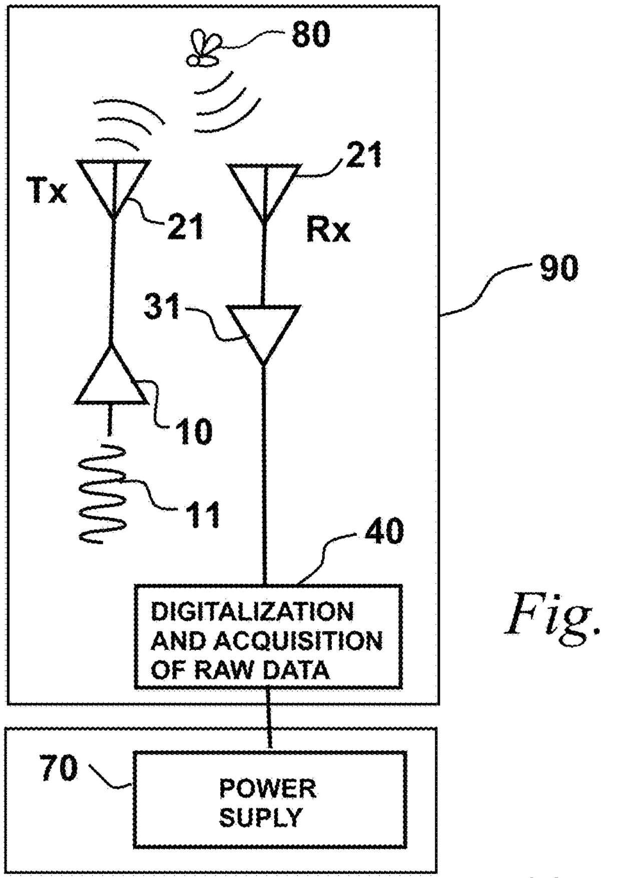
FIG. 1 is a block diagram of the radar used to acquire the raw data of the insects for subsequent processing and corresponding signature extraction.

An insect or an animal exhibits two basic types of movement: translational movement and its own intrinsic movement. Translational movement refers to the displacement of the insect or animal along the three axes. Intrinsic movement consists of wing flapping or movement of the legs or body, which may be decoupled (i.e., independent)

from its translational movement. For example, a hovering insect exhibits only intrinsic movement and no translational movement.

The radar can measure both basic types of movement of insects or animals in the radial direction, that is, the projection of the movements along the direction of radar signal propagation. Translational movement is measured through the Doppler frequency. Intrinsic movement is measured through the micro-doppler.

For example, if an insect moves at 0.1 m/s in the radar's radial direction and the radar detects it in the C band with a wavelength of 5 cm, the radar will measure a translational Doppler frequency of 4 Hz using the equation FDoppler=2*V/λ, where V is the velocity and λ is the wavelength. However, if the insect's wing flapping reaches a speed of 1 m/s back and forth, projected in the radial direction, the wings will generate a micro-Doppler ranging from −40 Hz to +40 Hz. Thus, we may have a spectrum with an 80 Hz bandwidth centered at 4 Hz. The 80 Hz bandwidth results from the wing flapping, and the 4 Hz corresponds to the insect's translational movement.

Each insect exhibits a characteristic intrinsic movement that can be represented by the frequency spectrum of the micro-Doppler. However, this movement changes over time, resulting in a representation made up of a series of spectra, which is called a spectrogram. The micro-Doppler spectrogram is thus a historical record of micro-Doppler spectra caused by the intrinsic movement of insects or animals.

Thus, for example, an insect may flap its wings at 1 m/s and generate a spectrum with a bandwidth of 80 Hz, as presented above. However, it may increase its wing-flapping speed to 1.5 m/s, resulting in a bandwidth increase to 120 Hz, and then reduce it to 0.5 m/s, reducing the bandwidth to 40 Hz. In other words, the micro-Doppler bandwidth may vary in width over time and is therefore well represented by the spectrogram.

In addition to the high-frequency echo produced by wing flapping, there may also be a low-frequency echo due to the insect's flight within the container. To obtain the spectrogram of interest, it is sufficient to pass the reflected signal through a high-pass filter, which eliminates the influence of the insect's flight.

Another approach that may be adopted consists of immobilizing the insect using, for example, adhesive.

Both the bandwidth and its variation over time are key parameters for characterizing the insect or animal and are present in the spectrogram. Another piece of information present in the spectrogram is the intensity of the micro-Doppler return signal, which is represented by the intensity of the lines in the spectrogram shown in graph 420 of FIGS. 3 and 5.

The spectrogram is therefore the main piece of information used for detecting and classifying insects or animals. In addition to the shape of the spectrogram—which is distinct and specific to each insect or animal—additional patterns are also extracted from its shape, in a process called pattern extraction.

Finally, a neural network is trained based on the spectrogram and also on the patterns extracted from its shape (that is, the insect's signature), and this process is called neural network training. The trained neural network is integrated into the radar, and it then becomes capable of detecting, classifying, estimating the quantity of, and locating insects and/or animals. This process will be explained below.

Figure 2:
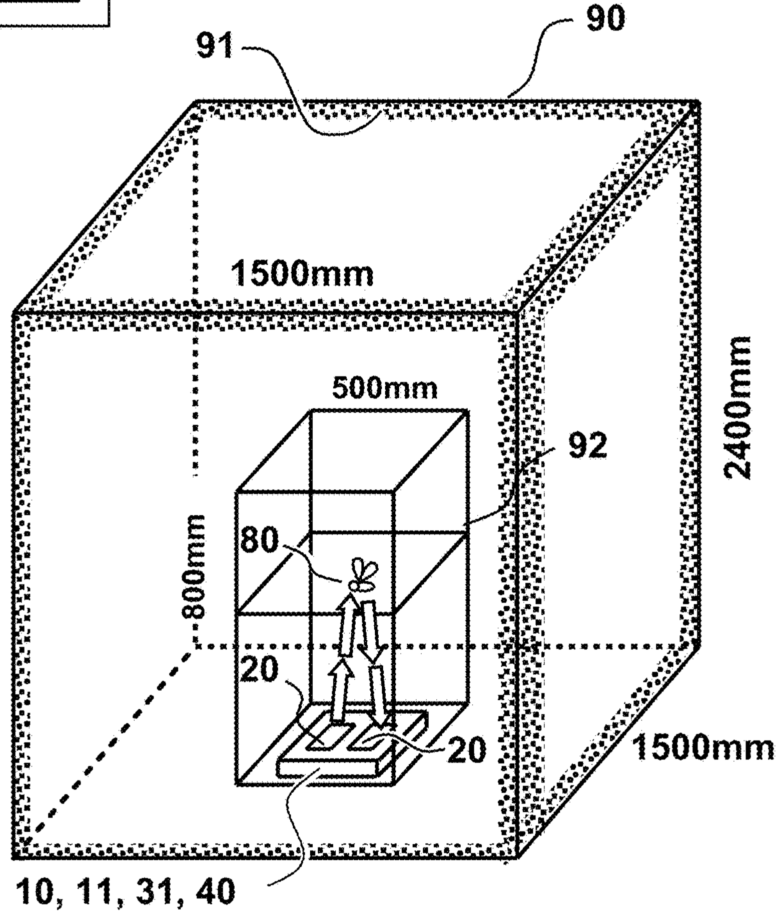
FIG. 2 illustrates the construction of the apparatus used to accommodate the radar and the insects for the purpose of acquiring the insects' raw data for subsequent processing and corresponding signature extraction.

To obtain the signature of the insect or animal, a specific apparatus is used, comprising a centimeter-wave radar and an anechoic chamber, as shown in FIGS. 1 and 2.

FIG. 1 presents the block diagram of the apparatus. Insect 80 is illuminated by the transmission antenna Tx of radar 20, and its reflected signal is received by the reception antenna Rx of radar 21. The radar generates a pulsed or continuous wave 11, which is amplified by amplifier 10 and sent to the transmission antenna 20. Since the distance between antennas 20 and 21 and insect 80 is only a few decimeters, this radar transmits and receives simultaneously and only measures Doppler and micro-Doppler frequencies. In other words, the distance to the insect does not need to be measured, as this setup is intended only for collecting Doppler and micro-Doppler frequencies corresponding to wing flapping.

The signal reflected by insect 80 is received by antenna 21, amplified by the low-noise amplifier 31, and sent to digitization and acquisition module 40. To prevent interference with the measurement, the radar and the insects are placed inside an anechoic chamber 90, and the power supply 70 is positioned outside the anechoic chamber.

FIG. 2 presents an example of the physical setup of the apparatus outlined in FIG. 1. The radar, composed of parts 10, 11, 31, and 40, is located on the floor of the anechoic chamber 90, which has microwave-absorbing layers 91 on all its sides. Insect 80 is placed inside a cage or container 93, which is suspended and separated from the radar by base 92. Depending on the size of the insect or animal, the anechoic chamber and its internal setup may vary in size. For most insects, recommended dimensions are: anechoic chamber 90 with a 1500 mm base and 2400 mm height; base 92 with 800 mm; and cage 93 with 500 mm.

For large vertebrate animals such as wild boars and capuchin monkeys, it is recommended that the radar composed of 10, 11, 31, and 40 illuminate a cage or area where the animals are moving naturally. In this case, the echo to be processed corresponds to the movement of appendages (legs and arms).

Figure 3:
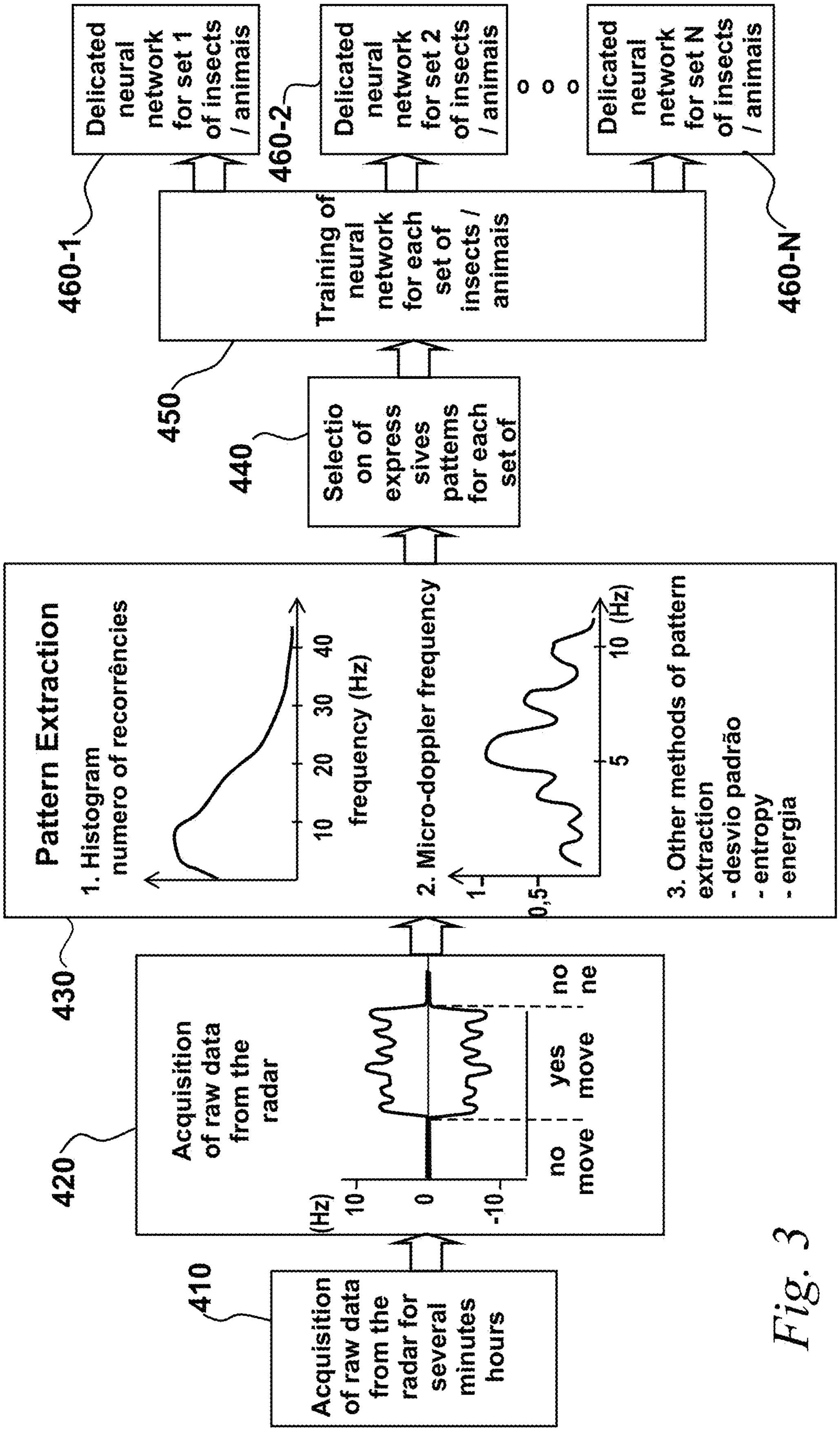
FIG. 3 shows the block diagram corresponding to the processing of the data obtained through the apparatus illustrated in the previous figure, the extraction of insect signatures, and the training of the neural network.

The data acquired by the specific apparatus for signature collection, shown in FIGS. 1 and 2, are processed according to the block diagram in FIG. 3. The raw data acquisition operation from the radar—composed of 10, 11, 31, and 40—which may last several minutes or even hours, is referred to as 410 and generates raw data from which the corresponding spectrogram is calculated in step 420. In the example shown in FIG. 3, the insect produces a micro-Doppler with bandwidth ranging from 2 to 10 Hz, varying over time. Before and after this wing-flapping phase, the insect is not flapping its wings, meaning the micro-Doppler frequency is 0.

To ensure that the winged insect does not exhibit translational or low-frequency Doppler movement, it is secured by its legs inside the cage in such a way that it can flap its wings without performing translational movement. Another approach is to suspend the insect using a wire. In both cases, it ends up generating only micro-Doppler and not Doppler.

In the case of wingless insects, they are placed inside a small plastic container within the cage, allowing them to move within a limited area. This is the case, for example, of the boll weevil, which moves slowly.

Other insects, such as caterpillars, may be placed on a plant so that they have an environment conducive to their movement. Translational movement may also be considered in the spectrograms. The technique for handling the insect at this stage of radar echo capture will depend on the species and its relevance in the natural detection context.

In step 430, pattern extraction from the spectrogram is performed, including the histogram, the frequency history of the micro Doppler, and other patterns such as standard deviation, kurtosis, entropy, and energy of the spectrogram. All of these patterns will be analyzed for each insect, and only the patterns most relevant to detection and classification will be selected in step 440 for signature formation. Less significant patterns will be discarded.

The neural network will be trained with the signatures selected in step 450, and specific neural networks, 460-1 to 460-N, will then be generated for the detection and classification of a specific insect or animal, or a group of insects or animals.

Each specific neural network, here represented as 460-1 to 460-N, was trained for a specific insect or animal. To detect and classify multiple insects, the respective trained neural networks must be used. Each block, represented as 460-1 to 460-N, is implemented as a software routine that will be loaded into the operational radar 900.

Figure 4:
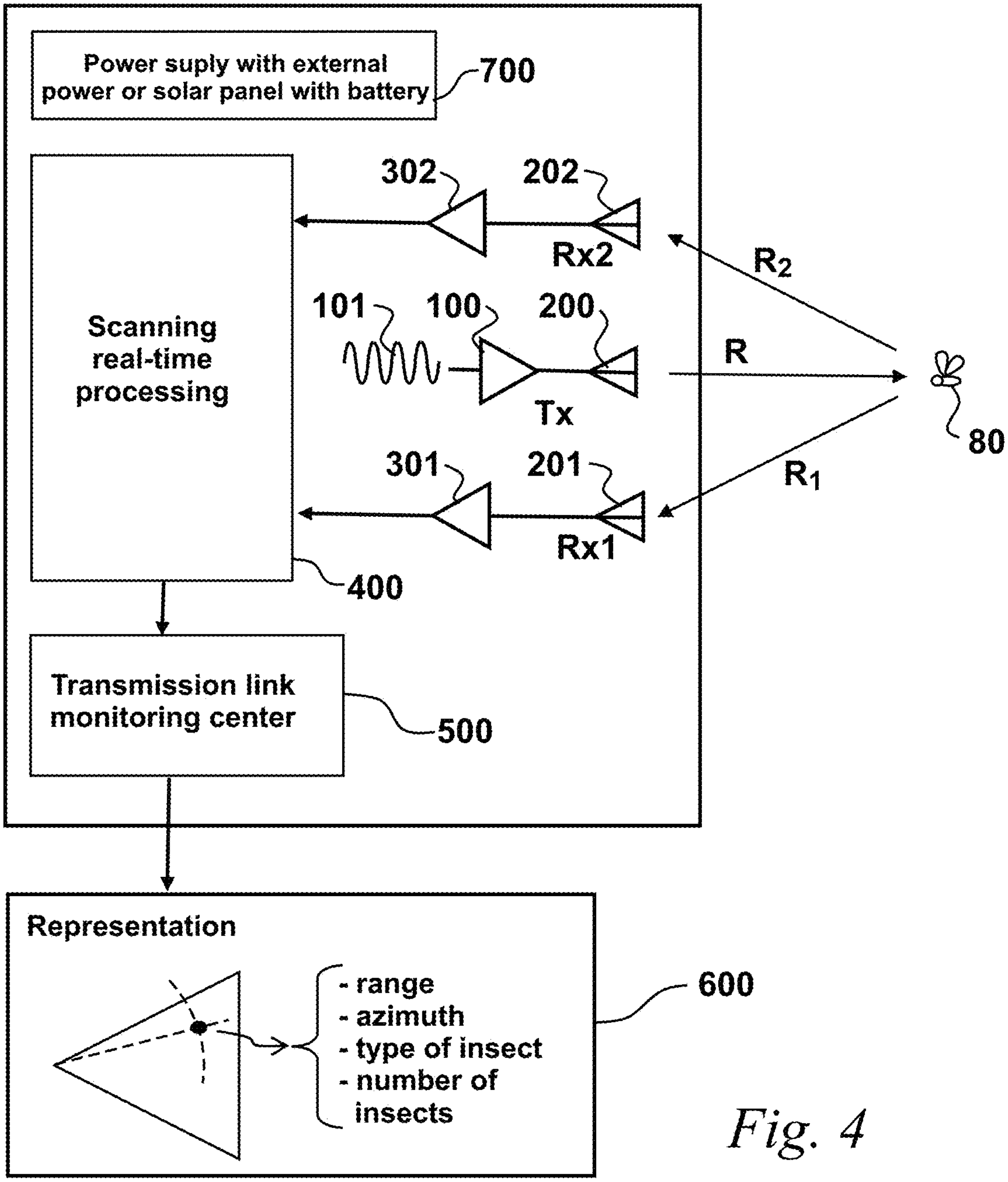
FIG. 4 is a block diagram of the radar for detection, classification, estimation of quantity, and localization of insects and animals.

The operational radar 900 for detecting and classifying insects and/or animals in the field is shown in FIG. 4. Transmission pulse 101 is amplified by amplifier 100 and transmitted by transmission antenna 200 to insect 800. The signal reflected by insect 800 is captured by reception antennas 201 and 202 and amplified by amplifiers 301 and 302, respectively. Then, module 400 performs real-time digitization and processing of the signals amplified by amplifiers 301 and 302. Real-time processing in 400 detects, classifies, and locates the insects and/or animals and transmits this information with low data rate via transmission link 500 to the remote monitoring system 600. An operator or monitoring system receives information about range, azimuth, type of insect or animal, and their quantity. The range and azimuth information may also be converted into a location, represented in latitude and longitude, for example.

Figure 5:
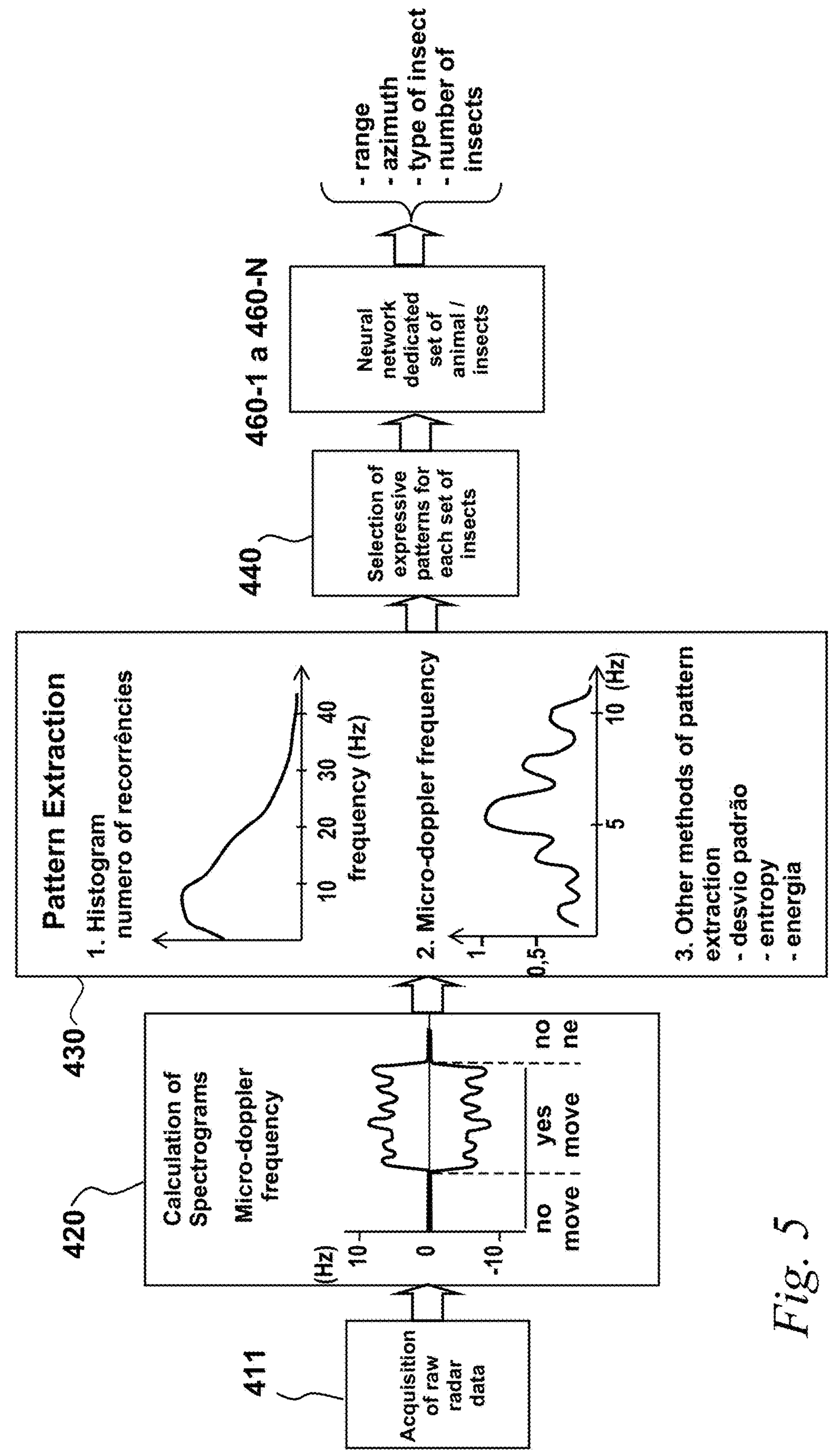
FIG. 5 is a block diagram of the processing of the raw radar data from the previous figure.

The real-time processing system 400 of operational radar 900 is described in FIG. 5, which corresponds to field use. The block diagram is very similar to that of FIG. 3, which represents the sequence of steps performed in the laboratory. In this case, one or more trained neural networks, 460-1 to 460-M, generated by the process in FIG. 3 and loaded into real-time processor 400, are used to analyze the signal acquired by operational radar 900 through subsystems 411, 420, and 430, which belong to real-time processing 400.

FIG. 6 shows the installation of operational radar 900 in a crop field. Antennas 200, 201, and 202 of radar 900 illuminate an area 901 with an azimuth or horizontal angle $\theta a$ and cover a predefined area of the field 910. Insects 920 are detected by radar 900 at a range R and an azimuth angle $\theta$ from the center of antennas 200, 201, and 202. Range R and angle $\alpha$ may be converted into latitude and longitude for positioning in the field terrain.

FIGS. 7-*a* and 7-*b* present the case of simultaneous monitoring of insects and animals, where insects and a capuchin monkey are found in an industrial forest. Radar 900 is able to detect and classify both insects and animals simultaneously. In the case of vertebrate animals, the micro-Doppler echo will be produced by movements of the body and appendages (arms and legs).

Although the invention has been described based on a particular embodiment, it is understood that, since this embodiment is exemplary, modifications may be introduced by those skilled in the art, provided they remain within the conceptual limits of the invention, which is therefore defined and delimited by the set of claims that follows.

Thus, for example, the species identification step using neural networks may be replaced by fuzzy logic techniques or even by maximum likelihood.

The invention claimed is:

1. A method for detection and classification of animals using radar, comprising: comparing between a set of patterns derived from an echo of a centimeter-wave radar signal captured in the field by an operational radar and a characteristic signature of each animal species, determined through the processing of data captured in a laboratory.

2. The method according to claim 1, wherein said processing comprises generating a spectrogram of a Doppler signal generated by movement of appendages of each animal species.

3. The method according to claim 2, wherein said movement comprises wing flapping of insects.

4. The method according to claim 2, wherein said movement comprises movement of one or more appendages and a body of a wingless animal species.

5. The method according to claim 1, wherein said processing further comprises extracting specific patterns for each insect or animal species, said extraction comprising the processing of information related to the histogram, standard deviation, kurtosis, skewness, entropy, and energy of the radar signal echo.

6. The method according to claim 1, wherein said data capture in the laboratory comprises illuminating the animal species by a radiation beam of a centimeter-wave radar and capturing of a reflected signal inside an anechoic chamber.

7. The method according to claim 6, wherein the animal species illuminated by the radar beam is kept inside a cage.

8. The method according to claim 6, wherein the animal species is illuminated by the radar beam is kept inside a small plastic container.

9. The method according to claim 6, wherein the animal species is immobilized using adhesive.

10. The method according to claim 6, wherein the animal species is suspended by a wire.

11. The method according to claim 2, wherein a specific signature of each animal species is generated from the spectrogram and the relevant patterns selected from the group consisting of: standard deviation, kurtosis, skewness, entropy, and energy of the radar signal echo.

12. The method according to claim 11, further comprising training of neural networks using the signatures of the animal species.

13. The method according to claim 12, further comprising loading of the neural networks trained with the signatures of the animal species into an operational radar.

14. The method according to claim 12, further comprising, after detection of the insect group by the neural networks, assessing its extent and its location is calculated, through range measurement R by propagation time and azimuth measurement by the phase difference of the reflected signals R1/R2, and thus its respective latitude and longitude.

15. The method according to claim 11, further comprising processing of the data included in the signatures of the animal species using fuzzy logic or maximum likelihood.

* * * * *